United States Patent
Endo et al.

(10) Patent No.: US 11,455,610 B2
(45) Date of Patent: Sep. 27, 2022

(54) SHOPPING SUPPORT SYSTEM

(71) Applicant: TOYOTA JIDOSHA KABUSHIKI KAISHA, Toyota (JP)

(72) Inventors: Masato Endo, Chofu (JP); Katsuhiko Yourou, Toyota (JP); Shunji Tateishi, Kasugai (JP); Nobukatsu Fujishita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/786,008

(22) Filed: Feb. 10, 2020

(65) Prior Publication Data
US 2020/0286063 A1     Sep. 10, 2020

(30) Foreign Application Priority Data

Mar. 4, 2019   (JP) ............................... JP2019-038838

(51) Int. Cl.
  *G06Q 20/20*   (2012.01)
  *G06Q 30/06*   (2012.01)

(52) U.S. Cl.
  CPC ....... *G06Q 20/208* (2013.01); *G06Q 30/0639* (2013.01)

(58) Field of Classification Search
  CPC .................... G06Q 20/208; G06Q 30/0639
  USPC ......................................................... 705/24
  See application file for complete search history.

(56) References Cited

U.S. PATENT DOCUMENTS

| | | | | |
|---|---|---|---|---|
| 5,154,260 A | * | 10/1992 | Patel ........................ | A47F 10/02 186/69 |
| 2004/0128025 A1 | * | 7/2004 | Deal ........................ | G07F 17/40 700/236 |
| 2005/0230472 A1 | * | 10/2005 | Chang ........................ | G07F 7/02 235/383 |
| 2014/0052498 A1 | * | 2/2014 | Marshall ............... | G07F 11/165 705/7.35 |
| 2014/0379532 A1 | * | 12/2014 | Agasti ................ | G06Q 30/0641 705/27.1 |
| 2016/0260159 A1 | * | 9/2016 | Atchley ............... | G05D 1/0061 |
| 2017/0278176 A1 | * | 9/2017 | Valkov .................... | B65B 35/10 |
| 2017/0322561 A1 | * | 11/2017 | Stiernagle ................ | B65G 1/04 |
| 2017/0334646 A1 | * | 11/2017 | High .................. | G06Q 30/0635 |
| 2019/0210799 A1 | * | 7/2019 | Kropp .................... | B65G 15/58 |
| 2019/0359424 A1 | * | 11/2019 | Avraham ............... | B25J 9/1689 |
| 2020/0017317 A1 | * | 1/2020 | Yap ...................... | B25J 15/0616 |
| 2020/0234393 A1 | * | 7/2020 | Kawai .................. | G05D 1/0248 |

FOREIGN PATENT DOCUMENTS

| | | |
|---|---|---|
| JP | 8-166992 A | 6/1996 |
| JP | 2002-128208 A | 5/2002 |
| JP | 2003-288641 A | 10/2003 |
| JP | 2008-9687 A | 1/2008 |

* cited by examiner

*Primary Examiner* — Florian M Zeender
*Assistant Examiner* — Nicole Elena Bruner
(74) *Attorney, Agent, or Firm* — Sughrue Mion, PLLC

(57) ABSTRACT

A shopping support system includes a management server, a reservation device such as a shooter, an automatic sorter, and a register.

The management server specifies a reserved product to be purchased in response to an operation input to the reservation device, controls the automatic sorter to pick up the reserved product to be purchased, transmits a price thereof to the register, and cause a moving object loaded with the settled product to move to a product receiving place by autonomous driving.

5 Claims, 9 Drawing Sheets

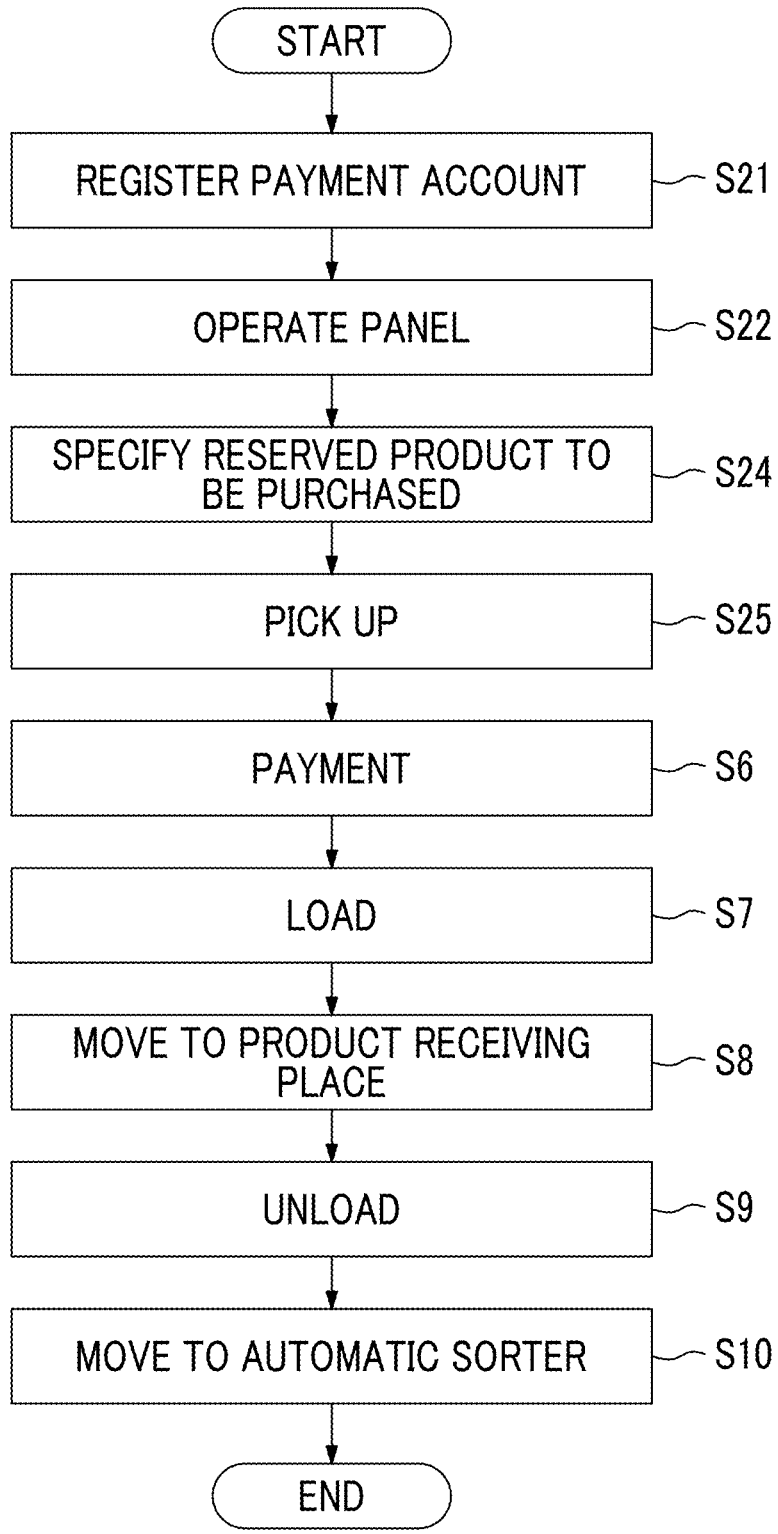

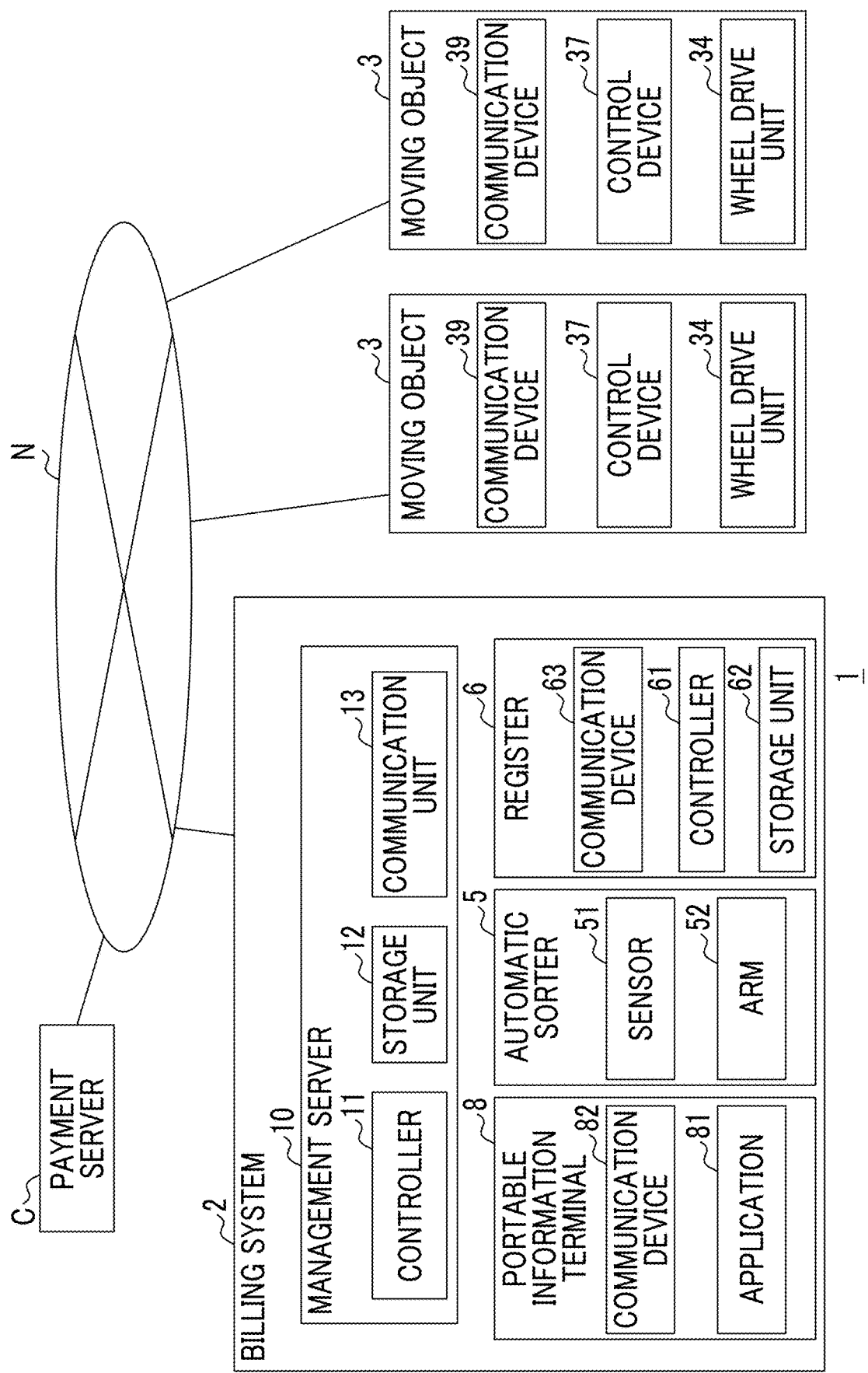

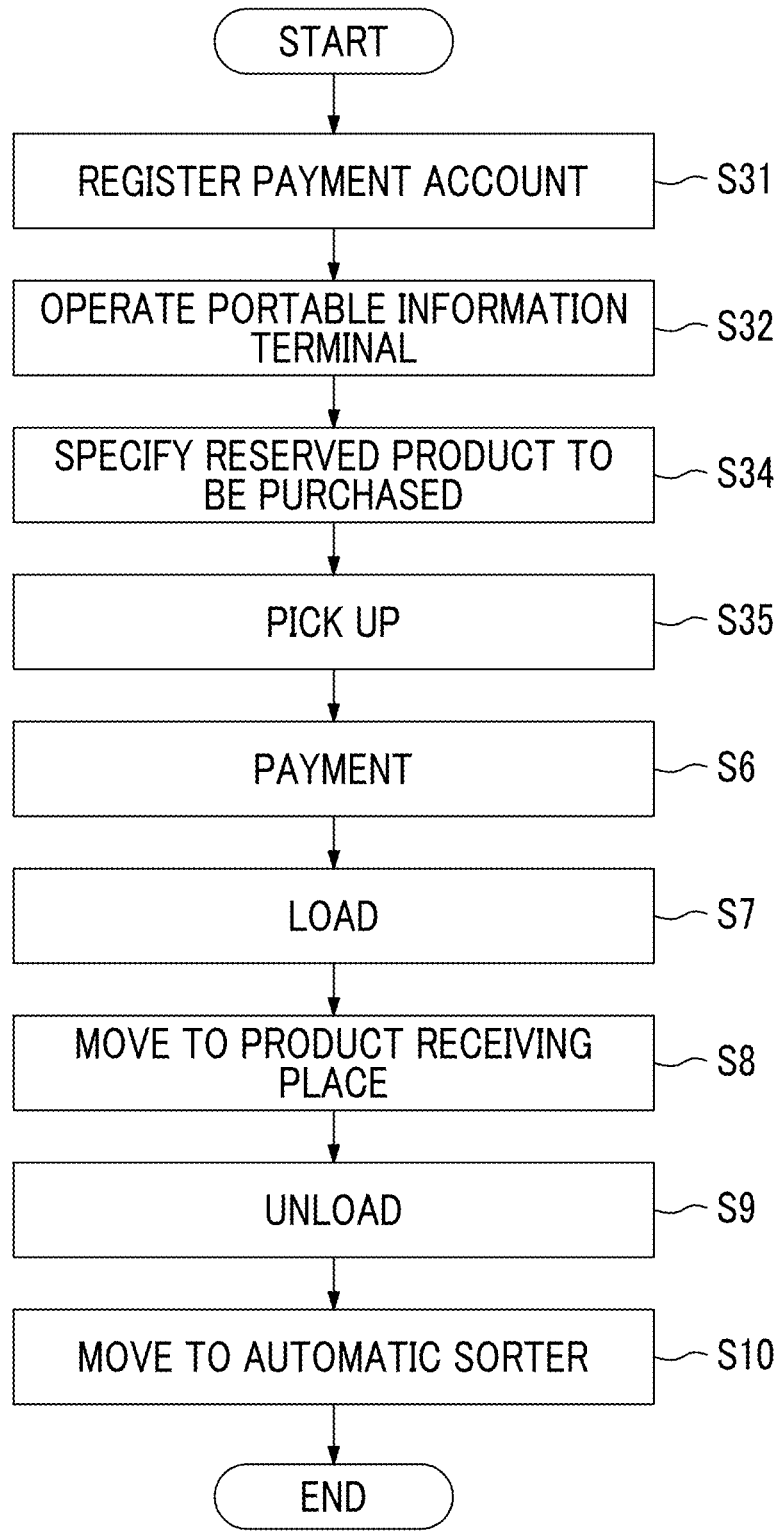

SHOPPING SUPPORT SYSTEM

INCORPORATION BY REFERENCE

The disclosure of Japanese Patent Application No. 2019-038838 filed on Mar. 4, 2019 including the specification, drawings and abstract is incorporated herein by reference in its entirety.

BACKGROUND

1. Technical Field

The present disclosure relates to a shopping support system.

2. Description of Related Art

Japanese Unexamined Patent Application Publication No. 2002-128208 (JP 2002-128208 A) discloses a device for transporting a shopping item from a store to a parking lot. A shopper brings a checked-out shopping item to a carry-in port 11. When a private car is designated as a destination at the carry-in port 11, a traveling carriage 14a adjacent to the private car is called and comes to receive the shopping item from the shopper.

SUMMARY

However, the traveling carriage 14a described in JP 2002-128208 A carries a product from a checkout register to the parking lot, but can solely be used after the checkout is completed. The shopper will carry a heavy product while the product is checked out. The present disclosure provides a shopping support system capable of reducing a burden of a shopper.

A first aspect of the present disclosure relates to a shopping support system including a management server configured to store information on a payment account and product receiving place of a shopper, a reservation device configured to allow the shopper to input an operation for designating a product desired to be purchased, an automatic sorter configured to pick up a product, a register configured to communicate with a payment server that manages the payment account, and a self-traveling moving object. The management server specifies a product designated in response to the operation input to the reservation device as a reserved product to be purchased, controls the automatic sorter to collect the reserved product to be purchased for each shopper, transmits purchase information to the register to charge the shopper for a price of the reserved product to be purchased, and controls the moving object to cause the moving object loaded with the product in a settled state to move to the product receiving place designated by the shopper.

It is possible for the moving object such as a micro mobility to board on an elevator and perform autonomous driving. In the store, the management server that cooperates with the moving object is prepared. According to the aspect, when the shopper designates a product, the management server settles a price of the designated product and the moving object delivers the product in a settled state to a designated point (for example, a parking lot or an entrance). It is possible for the shopper to shop empty-handed without carrying a shopping basket and receive the settled product from the moving object.

In the above aspect, the reservation device may be a shooter into which a product with a tag associated with each shopper is able to be put. The management server specifies a product with the tag as the reserved product to be purchased of the shopper associated with the tag when the product is put into an input port.

According to the aspect, it is possible for the shopper to designate a product desired to be purchased, by putting the product into shooters installed in various places instead of the shopping basket. The tag associated with the shopper is attached to the product put into the shooter, and the reserved products to be purchased are collected for each shopper by the automatic sorter and settled in the register.

In the above aspect, the reservation device may be a shooter for designating a product put into an input port as the reserved product to be purchased and may be configured such that the input port is switched to a state where the input port is associated with a shopper and is temporarily opened to be able to put a product when an operation is input from each shopper. The management server specifies a product put while the input port is open as the reserved product to be purchased of the shopper.

According to the aspect, it is possible for the shooter to associate and specify the product and the shopper with a timepoint when the product is put. Therefore, it is possible to omit an operation of attaching a tag to the product.

In the above aspect, the reservation device may be a display shelf provided with an operation panel. The management server specifies a product as the reserved product to be purchased of a shopper when information specifying the shopper and the product is input to the operation panel.

According to the aspect, it is possible for the shopper to designate the product desired to be purchased by inputting an operation on the operation panel provided with the display shelf, instead of putting a product on the display shelf into the shopping basket. The product designated on the display shelf is picked up by the automatic sorter from a warehouse and settled in the register.

In the above aspect, the reservation device may be an application installed in a portable information terminal that is able to be carried by each shopper. When information designating a product is input from any of the portable information terminals, the management server specifies a shopper holding the portable information terminal to specify the designated product as the reserved product to be purchased of the shopper.

According to the aspect, it is possible for the shopper to designate the product desired to be purchased from the application installed in the portable information terminal, instead of putting a product on the display shelf into the shopping basket. The product designated in the application is picked up by the automatic sorter from the warehouse and settled in the register. A difference from mail order sales is the involvement of the moving object.

According to the present disclosure, it is possible to provide a shopping support system capable of reducing the burden on the shopper.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 7 is a diagram showing an example of a flow of the shopping support system shown in FIG. 6;

FIG. 8 is a diagram showing an example of a configuration of a shopping support system according to a third embodiment of the present disclosure; and FIG. 9 is a diagram showing an example of a flow of the shopping support system shown in FIG. 8.

DETAILED DESCRIPTION OF EMBODIMENTS

Figure 1:
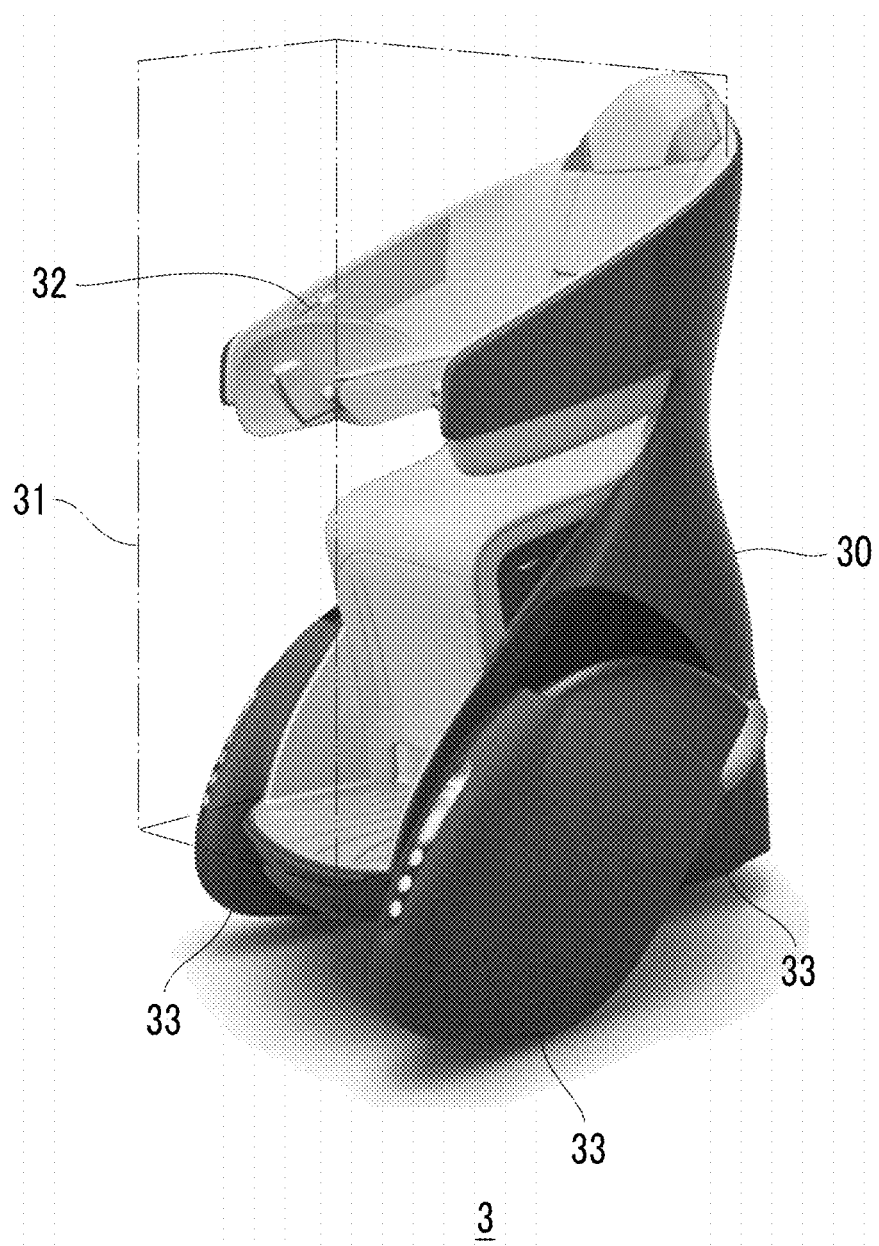
FIG. 1 is a perspective view of a moving object common to each embodiment of the present disclosure.

Preferred embodiments of the present disclosure will be described with reference to accompanying drawings. In each drawing, elements to which the same reference numeral is assigned have the same or similar configuration. A shopping support system 1 of each embodiment of the present disclosure uses a moving object 3 such as a micro mobility (refer to FIGS. 1 and 2). A management server 10 that cooperates with the moving object 3 is prepared in a store (refer to FIGS. 3, 6, and 8). When a shopper designates a product using a reservation device (for example, shooter 4), the moving object 3 delivers the product in a settled state to a point such as a parking lot (refer to FIGS. 4, 5, 7, and 9). Therefore, it is possible for the shopper to shop empty-handed without carrying a shopping basket.

The shopping support system 1 may include the shooter 4 in which a product can be put instead of the shopping basket (refer to FIGS. 3 to 5), a display shelf 7 in which a product can be designated by operating an operation panel (refer to FIGS. 6 and 7), or an application 81 in which a product can be designated by operating a portable information terminal 8 (refer to FIGS. 8 and 9). Hereinafter, each configuration will be described in detail with reference to FIGS. 1 to 9.

FIG. 1 is a perspective view showing an example of the moving object 3 common to each embodiment of the present disclosure. In the shown example, the moving object 3 includes a vehicle body 30, a storage 31 attached to the vehicle body 30, an operation panel 32 into which an operation can be input, and drive wheels 33 that cause the vehicle body 30 to move. A dimension of the moving object 3 is not particularly limited. For example, the dimension thereof is desirable to be small enough to be able to travel in a store passage and to be boarded in an elevator.

The storage 31 has a lock mechanism that can be locked by the shopping support system 1 and can be unlocked by the shopper. A configuration of the lock mechanism is not particularly limited. For example, the storage 31 may be unlocked when the shopper inputs a code number or password into the operation panel 32. For example, the storage 31 may be unlocked when an unlocking key such as an RF tag is lent to the shopper from the store and the shopper holds the unlocking key over the operation panel 32.

The operation panel 32 is an interface for a user of the moving object 3 to input an operation and includes an operation button, a touch panel, or the like. When the user inputs an operation, the operation panel 32 supplies a signal in response to the operation a control device 37 built in the vehicle body 30.

The drive wheel 33 includes a total of three wheels of two wheels disposed at the front and one wheel disposed at the rear. The moving object 3 can adjust a wheelbase when the drive wheel 33 disposed at the rear approaches or separates from the drive wheels 33 disposed at the front. Accordingly, the moving object 3 can make an occupied space small by shortening the wheelbase in waiting or a narrow place such as an elevator. When the user carries a heavy product, the wheelbase can be lengthened to lower the center of gravity.

Figure 2:
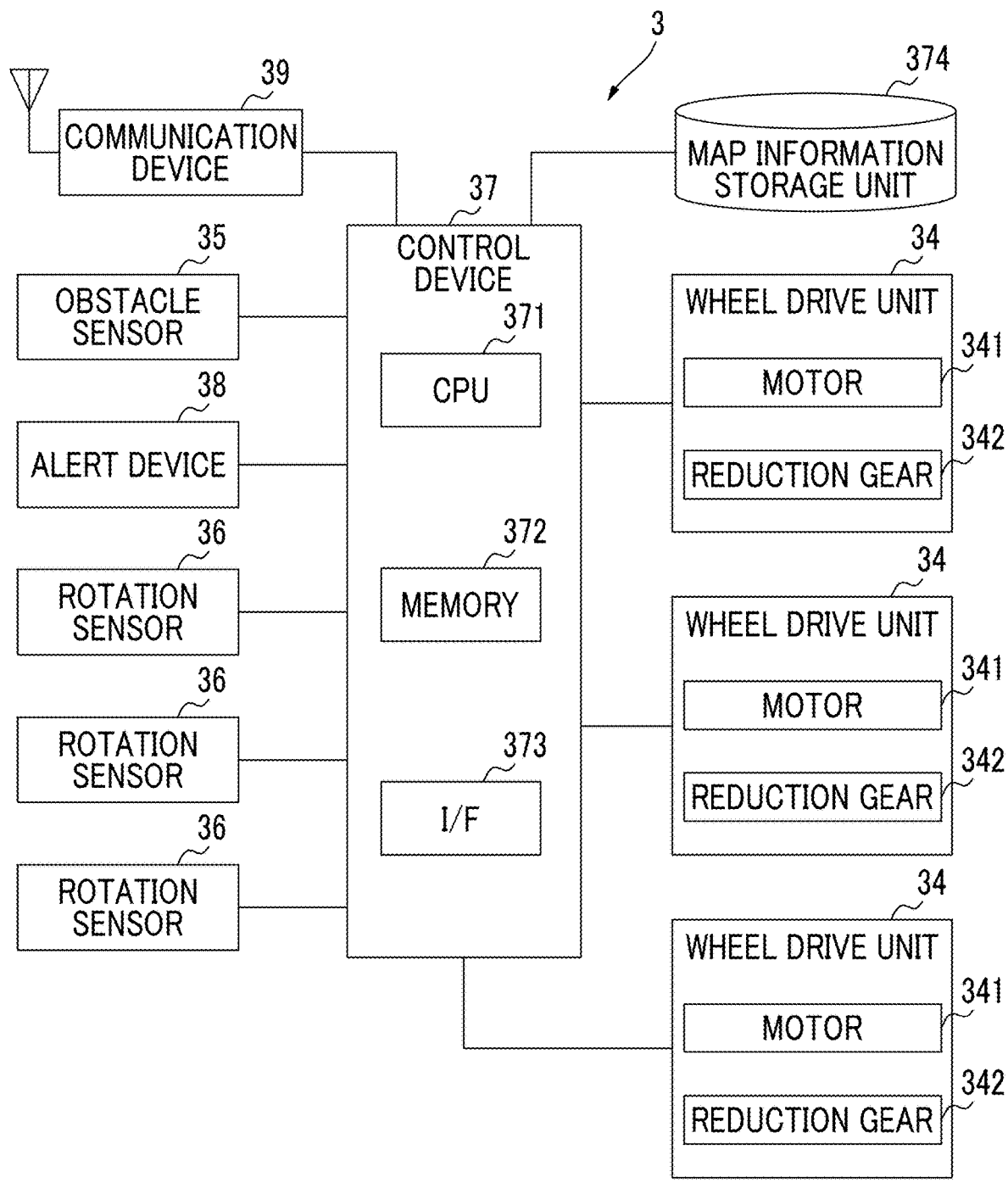
FIG. 2 is a diagram showing an example of a system configuration of the moving object shown in FIG. 1.

FIG. 2 is a diagram showing an example of a system configuration of the moving object 3 shown in FIG. 1. The moving object 3 includes a wheel drive unit 34 that drives each drive wheel 33, an obstacle sensor 35 that detects the presence or absence of an obstacle, a rotation sensor 36 that detects rotation information of each drive wheel 33, and the control device 37 that controls each wheel drive unit 34.

Each wheel drive unit 34 is built in the vehicle body 30 and drives each of the drive wheels 33. Each wheel drive unit 34 can rotationally drive each drive wheel 33 independently. Each wheel drive unit 34 includes, for example, a motor 341 and a reduction gear 342 connected to a rotating shaft of the motor 341 such that power can be transmitted.

The obstacle sensor 35 is provided in the vehicle body 30, detects the presence or absence of the obstacle or the approach of a passerby, and outputs the detected information to the control device 37. Each rotation sensor 36 is provided on each drive wheel 33 and can detect rotation information such as a rotation angle, a rotation angular velocity, and a rotation angular acceleration of each drive wheel 33. Each rotation sensor 36 is configured of, for example, a rotary encoder, a resolver, or the like, and outputs the detected rotation information to the control device 37.

The control device 37 generates and outputs a control signal for driving and controlling each wheel drive unit 34 based on detection values output from various sensors mounted on the moving object 3. The control device 37 executes predetermined arithmetic processing based on, for example, the presence or absence of the obstacle to be output from the obstacle sensor 35 and the rotation information of each drive wheel 33 to be output from each rotation sensor 36, and outputs a needed control signal to each wheel drive unit 34.

Hardware of the control device 37 is configured mainly of, for example, a central processing unit (CPU) 371 that performs control processing, arithmetic processing, and the like, a memory 372 configured of a read only memory (ROM) or a random access memory (RAM) in which a control program, an arithmetic program, and the like executed by the CPU 371 are stored, and an interface (I/F) 373 for inputting and outputting signals to and from the outside.

The CPU 371, the memory 372, the interface 373, and the like are connected to each other through a data bus or the like. The program executed by the CPU 371 may be provided in a state of being stored in a computer-readable storage medium. The storage medium can store the program in a tangible medium that is not temporary. The program includes, for example, a software program and a computer program.

In the shown example, the moving object 3 further includes an alert device 38, a communication device 39, a map information storage unit 374, and the like. The alert device 38 alerts to the passerby so as not to hit the moving object 3 in response to the signal from the control device 37.

A configuration of the alert device 38 is not particularly limited. The alert device 38 may be a speaker that outputs a sound or a light that lights or blinks a warning light.

The communication device 39 is configured of a communication circuit or the like for performing communication with a server device installed outside or a GPS satellite according to a predetermined communication standard. The communication device 39 includes, for example, a transmission circuit that transmits a radio wave through an antenna, a reception circuit that receives the radio wave through the antenna, and a switching circuit that switches the circuit connected to the antenna between the transmission circuit and the reception circuit.

The communication device 39 may acquire position information of the moving object 3, for example, from the GPS satellite, or from a plurality of sensors, wireless devices, security cameras, and the like which are installed in sites of the store. The map information storage unit 374 stores store map information of the store (for example, a route from an automatic sorter 5 to the parking lot or an entrance). The map information storage unit 374 may be the memory 372 built in the vehicle body 30 or a server device installed outside.

First Embodiment

Figure 3:
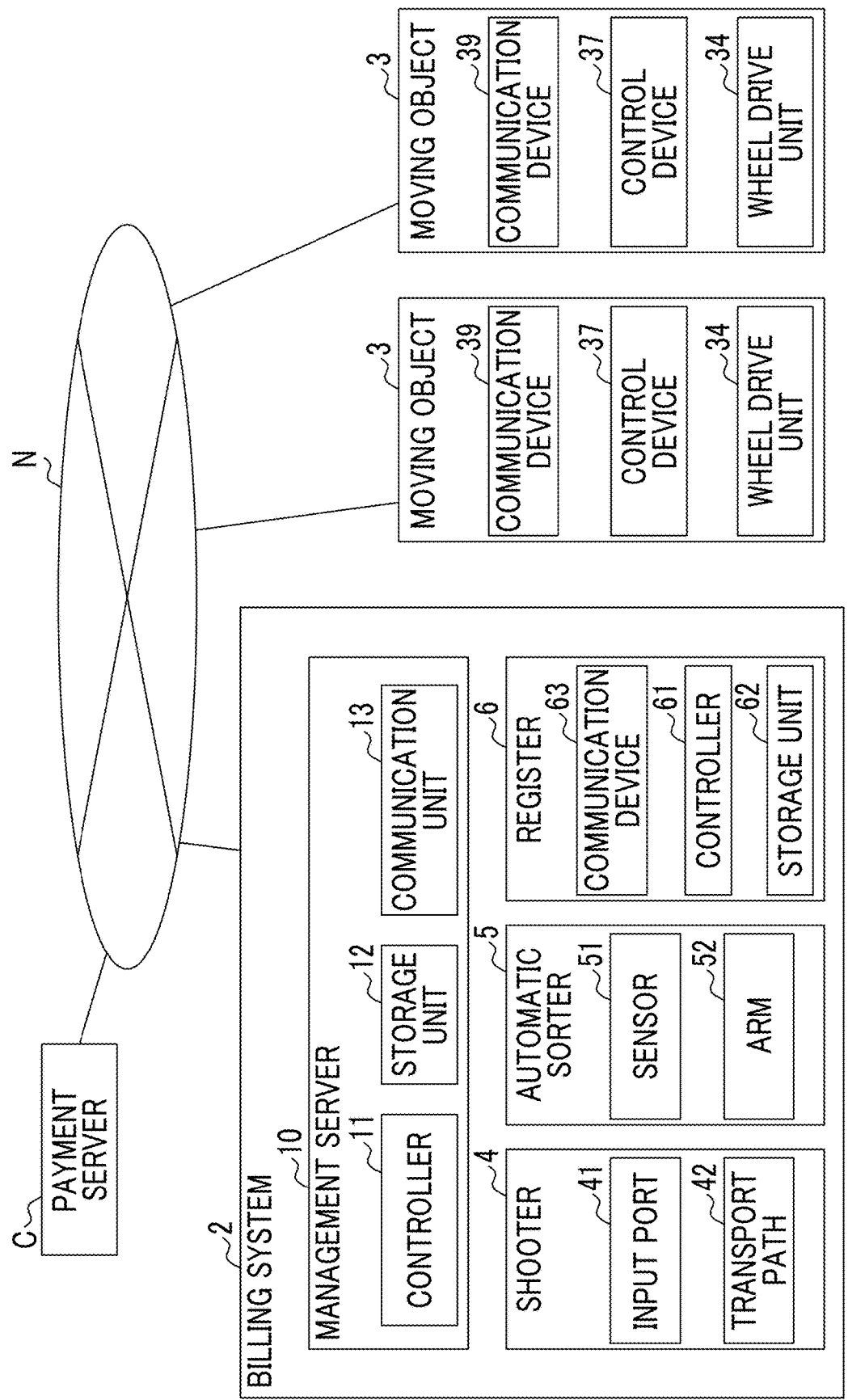
FIG. 3 is a diagram showing an example of a configuration of a shopping support system according to a first embodiment of the present disclosure.

A shopping support system 1 using the shooter 4 will be described as a shopping support system 1 according to a first embodiment of the present disclosure. FIG. 3 is a diagram showing an example of a configuration of the shopping support system 1 according to the first embodiment of the present disclosure. The shopping support system 1 according to each embodiment of the present disclosure includes a billing system 2 that settles a price of a product designated by the shopper in addition to the moving object 3 described above.

The moving object 3 receives a product in a settled state (purchased product) from the billing system 2 and delivers the product to the point designated by the shopper. The billing system 2 includes the reservation device that allows the shopper to input an operation for designating a product desired to be purchased (reserved product to be purchased), the automatic sorter 5 that can pick up a product, a register 6 that can communicate with an external payment server C managing a payment account of the shopper, and a management server 10 that manages the above.

The management server 10 includes a controller 11, a storage unit 12, and a communication unit 13. The controller 11 is configured of the CPU or the like that performs the control processing, the arithmetic processing, and the like. The storage unit 12 is configured of the ROM or RAM that stores the control program, the arithmetic program, and the like to be executed. The communication unit 13 is an interface for inputting and outputting signals with the moving object 3, the reservation device, the automatic sorter 5, the register 6, and the like.

The management server 10 stores information on the payment account of the shopper and a product receiving place. When the shopping support system 1 is used for the first time or every time the shopping support system 1 is used, the shopper registers the information in the management server 10. The payment account of the shopper may be a payment account provided by a credit card company or the like, or may be a payment account prepared by the store in which the shopper deposits money by a prepaid method or a post-pay method.

The product receiving place for the shopper is, for example, the parking lot or the entrance. When the product receiving place cannot be changed or is not changed, the shopper does not always need to register the product receiving place. In the case, a product receiving place set by the store may be regarded as the product receiving place for the shopper and registered in the management server 10.

In the shown example, the shooter 4 in which a product can be put into an input port 41 is disclosed as an example of the reservation device. Although the details will be described below with reference to FIGS. 6 to 9, the reservation device is not limited to the shooter 4. The shooter 4 includes the input port 41 into which the product is put and a transport path 42 for transporting the put product. The shopper can designate products desired to be purchased by putting the products into the shooters 4 installed in various places in the store instead of the shopping basket.

In order to associate a shopper with a reserved product to be purchased of the shopper, for example, a tag associated with the shopper may be added to the product. The shopper can designate the reserved product to be purchased by putting the tagged product into the shooter 4. Alternatively, an operation panel for switching the shooter 4 to a state associated with the shopper may be installed at the input port 41. In the case, the shopper can designate the reserved product to be purchased by operating the operation panel and then putting the product into the shooter 4.

The automatic sorter 5 receives products put into the shooter 4 and collects the products for each shopper. The automatic sorter 5 includes, for example, a sensor 51 that identifies a product, an arm 52 that picks up a product, and the like. The register 6 charges the shopper for the price of the product through a communication network N. The register 6 includes, for example, a storage unit 62 that receives and stores purchase information transmitted from the management server 10 and a communication device 63 that can communicate with the payment server C managing the payment account of the shopper provided by the credit card company or the like.

Figure 4:
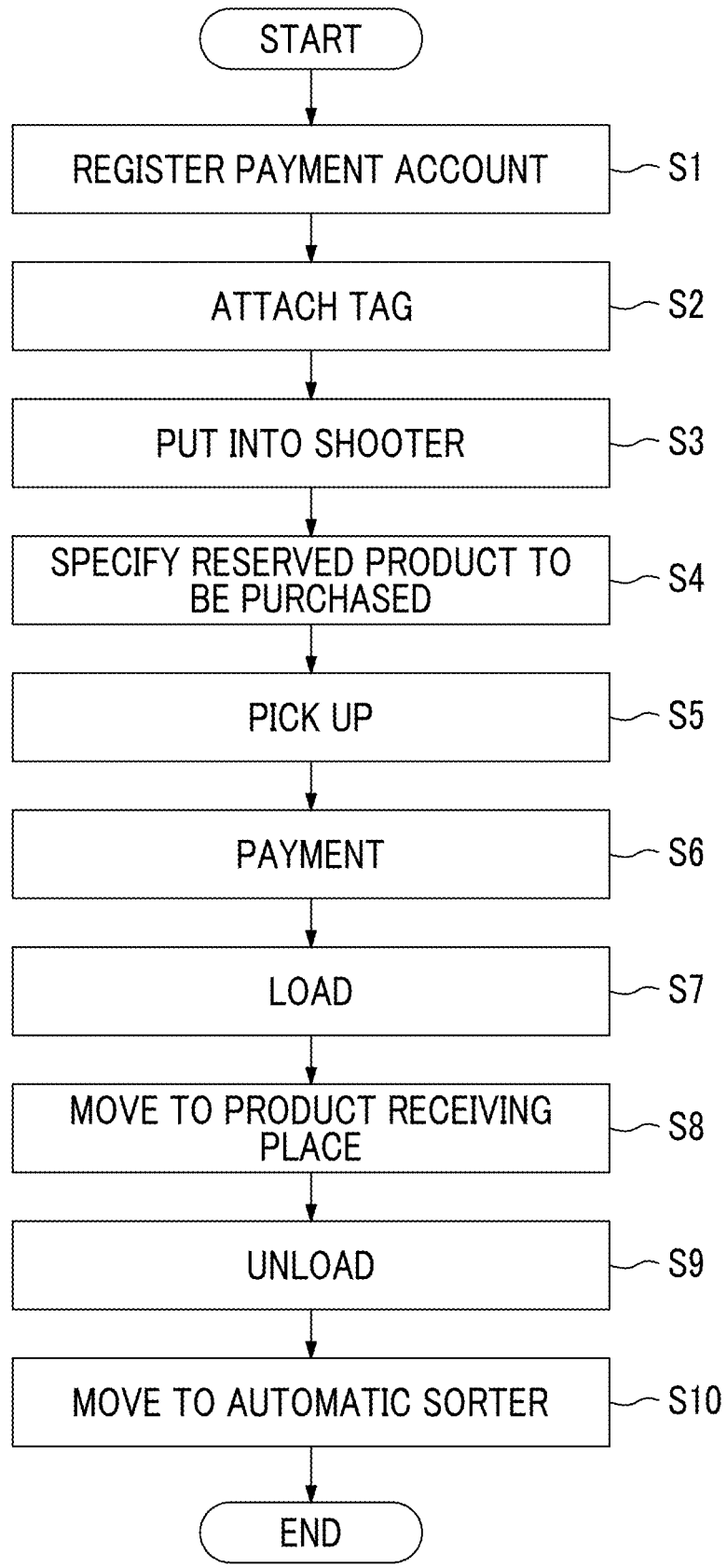
FIG. 4 is a diagram showing an example of a flow of the shopping support system shown in FIG. 3.

FIG. 4 is a diagram showing an example of a flow of the shopping support system 1 shown in FIG. 3. As shown in FIG. 4, the shopper registers the payment account and the product receiving place in the management server 10 (S1). The store provides a tag associated with each shopper to the shopper (S2). Each shopper selects a product from a display shelf S and puts the product into the shooter 4 in a state where a unique tag is attached to the product (S3). When the shooters 4 are installed in various places, the shopper does not need to carry a heavy shopping basket.

Products put into the shooter 4 are sent to the automatic sorter 5. The management server 10 reads the tags attached to the products to specify the reserved products to be purchased that each shopper desires to purchase (S4). A sensor for reading the tags may be provided in the shooter 4 or in the automatic sorter 5. The management server 10 controls the automatic sorter 5 to pick up the products flowing through the transport path 42. The products sent to the automatic sorter 5 are picked up by the arm 52 or the like and are collected for each shopper (S5).

The management server 10 transmits the purchase information to the register 6 and charges the shopper for a price of reserved products to be purchased. The price of the products collected for each shopper is calculated by the register 6 and charged to a credit card or electronic money payment account used by the shopper (S6). S6 may be earlier than S5. When the products are not delivered, the moving object 3 is waiting near the automatic sorter 5. The products in a settled state are loaded onto the moving object 3 (S7). The products may be loaded onto the moving object 3 by the arm 52 of the automatic sorter 5 or means different from the automatic sorter 5.

The management server 10 controls the moving object 3 to cause the moving object 3 to move to a point designated by the shopper (for example, the parking lot or the entrance) (S8). In the case, the moving object 3 is preferable to transmit an identification signal from its own device. According to the aspect, it is possible to acquire position information of each moving object 3 using both the identification signal from each moving object 3 and information detected by the camera or sensor of the moving object 3 in an indoor facility such as a shopping center. A mark or the like for specifying the position thereof may be installed in the indoor facility.

When the information on a current position of each moving object 3 can be acquired, it is possible to minimize a waiting time of the shopper who waits for the arrival of the moving object 3 at the designated point. Conversely, the shopping support system 1 may be configured such that the management server 10 transmits, to the shopper, information indicating that the moving object 3 has already arrived at the product receiving place when the shopper has not yet arrived at the parking lot.

The information indicating that the moving object 3 has already arrived at the product receiving place may be an e-mail or a short message service (SMS) addressed to contact information of the shopper registered in the management server 10, or a bulletin board in the store or in-house broadcasting. When the shopper unloads the product and the storage 31 becomes empty (S9), the moving object 3 moves near the register 6 in preparation for a next shopper and waits until a new product is loaded (S10).

Figure 5:
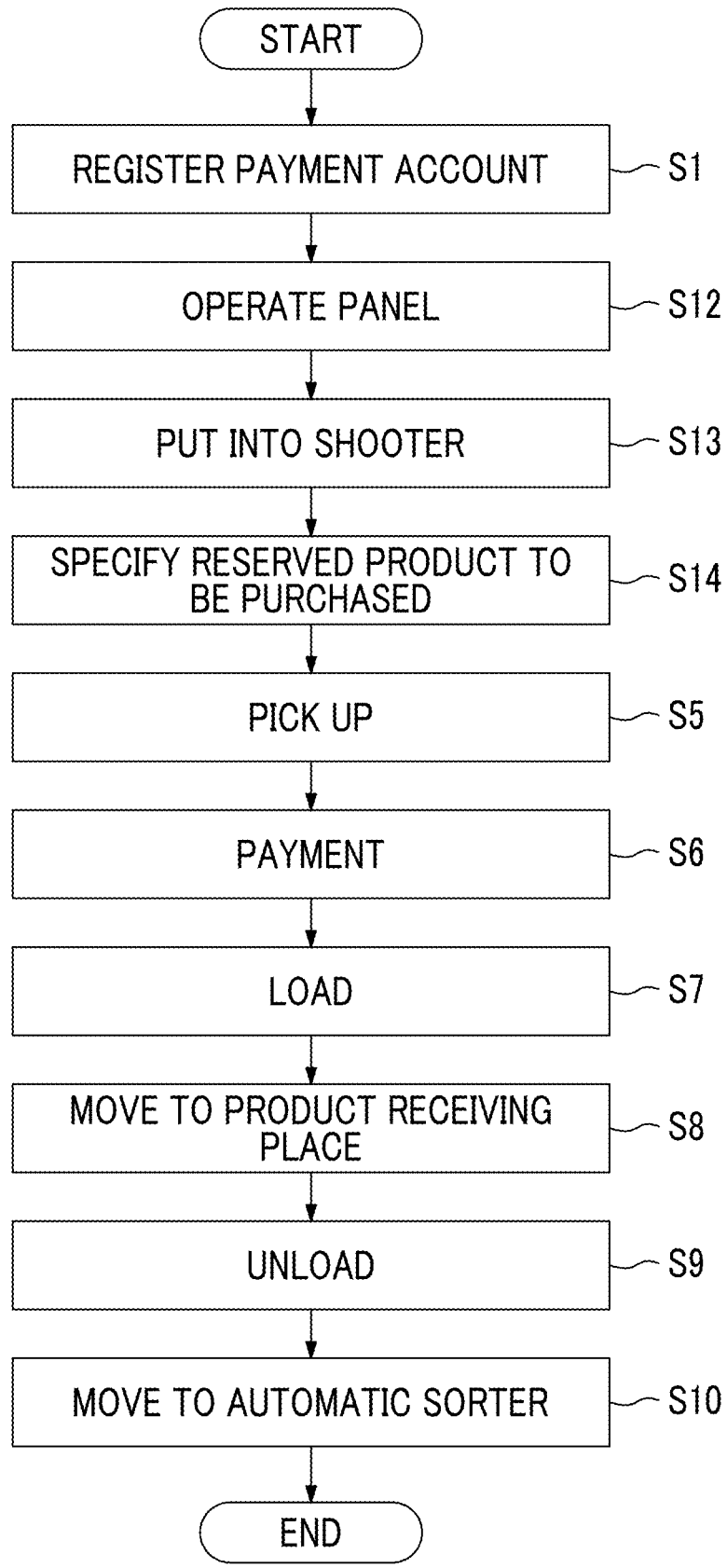
FIG. 5 is a diagram showing a modification example of the flow of the shopping support system shown in FIG. 3.

FIG. 5 is a diagram showing a modification example of the flow of the shopping support system 1 shown in FIG. 3. In the example shown in FIG. 5, the tag associated with the shopper is not used. Steps S2, S3, and S4 described above can be omitted. In the modification example, step S12 is included instead of step S2, step S13 is included instead of step S3, and step S14 is included instead of step S4.

More specifically, when an operation is input from each shopper, the shooter 4 is switched to a state where the input port 41 is associated with the shopper and the input port 41 is temporarily opened to enable a product to be put (S12). When the product is put into the shooter 4 (S13), the management server 10 specifies the product put while the input port 41 is open as the reserved product to be purchased for the shopper (S14).

With the shopping support system 1 of the embodiment configured as described above, it is possible for the shopper to designate the products desired to be purchased, by shopping empty-handed without carrying the shopping basket and putting the products into the shooters 4 installed in various places. The products put into the shooters 4 are collected by the automatic sorter 5 and automatically settled by the register 6. Since the settled products can be received at the parking lot, a burden on the shopper is reduced.

Next, shopping support systems 1 according to a second and a third embodiments will be described. For a configuration that has the same or similar function as the configuration described in first embodiment, the same reference numeral is assigned and the corresponding description of first embodiment is referred. Description thereof is omitted here. The configurations other than those described below are the same as those in the first embodiment.

Second Embodiment

Figure 6:
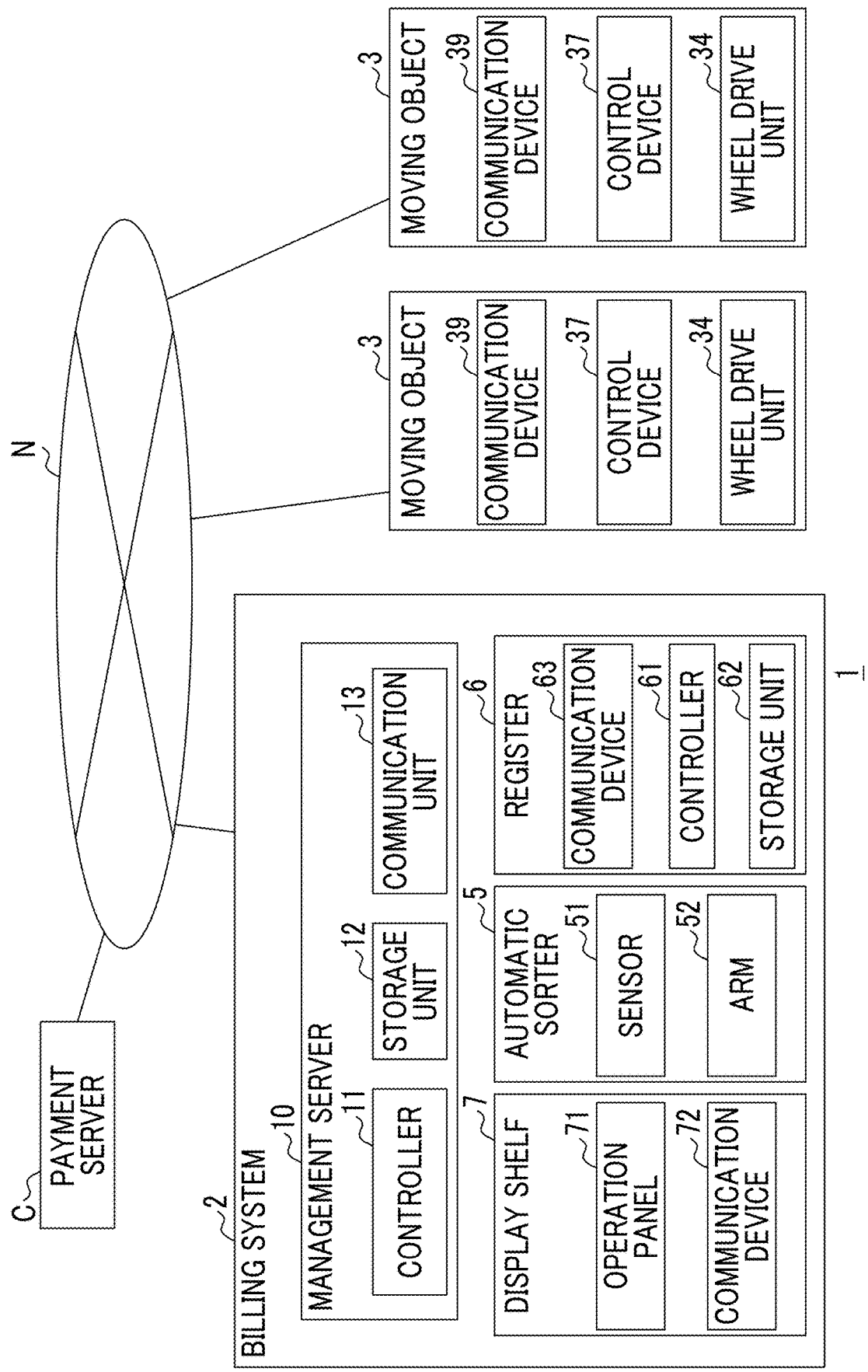
FIG. 6 is a diagram showing an example of a configuration of a shopping support system according to a second embodiment of the present disclosure.

The shopping support system 1 using the display shelf 7 will be described as the second embodiment of the present disclosure. The second embodiment is different from the first embodiment in that a product is designated using the display shelf 7 instead of the shooter 4. FIG. 6 is a diagram showing an example of a configuration of a shopping support system according to the second embodiment of the present disclosure. As shown in FIG. 6, the display shelf 7 includes an operation panel 71 for designating a product and a communication device 72 that can communicate with the communication network N.

FIG. 7 is a diagram showing an example of a flow of the shopping support system shown in FIG. 6. As shown in FIG. 7, the shopper registers the payment account and the product receiving place in the management server 10 (S21). The shopper inputs an operation to the operation panel 71 to designate a product (S22). For example, an identification code that specifies each shopper and an identification code that specifies a product may be input to the operation panel 71.

Alternatively, the reserved product to be purchased may be designated by holding an RF tag (for example, a store membership card) associated with each shopper over the operation panel 71 such that at least a part of the display shelf 7 is switched to a state of temporarily associating with the shopper and then by pressing a button provided with the product.

The communication device 72 transmits the input operation to the management server 10. The management server 10 specifies the product as the reserved product to be purchased of the shopper according to the received information (S24). The management server 10 controls the automatic sorter 5 to pick up a product corresponding to the reserved product to be purchased from a warehouse (S25). The subsequent steps are the same as S6 to S10 in the first embodiment. According to the second embodiment, it is possible for the shopper to shop empty-handed without carrying a shopping basket similar to the first embodiment. Since the settled products can be received at the parking lot, a burden on the shopper is reduced.

Third Embodiment

The shopping support system 1 using a portable information terminal 8 that can be carried will be described as the third embodiment of the present disclosure. The third embodiment is different from the second embodiment in that a product is designated using an application 81 installed in the portable information terminal 8 instead of the operation panel 71 of the display shelf 7. The portable information terminal 8 may be a dedicated product lent from the store or may be a smartphone or the like owned by the shopper.

FIG. 8 is a diagram showing an example of a configuration of a shopping support system according to the third embodiment of the present disclosure. As shown in FIG. 8, the application 81 that can designate a product desired to be purchased is installed in the portable information terminal 8. Needless to say, the portable information terminal 8 includes a communication device 82 that can communicate with the communication network N.

FIG. 9 is a diagram showing an example of a flow of the shopping support system shown in FIG. 8. As shown in FIG.

9, the shopper registers the payment account and the product receiving place in the management server 10 (S31). The shopper inputs an operation to the portable information terminal 8 to designate a product while viewing the product displayed on the display shelf S or from a place such as a resting place (S32). For example, a product and quantity are designated by touching a thumbnail displayed on the application 81. The portable information terminal 8 transmits the input operation to the management server 10. The management server 10 specifies a shopper from the portable information terminal 8 which is a transmission source and also specifies the product designated by the portable information terminal 8 as the reserved product to be purchased for the shopper (S34). The management server 10 controls the automatic sorter 5 to pick up a product corresponding to the reserved product to be purchased from the warehouse (S35). The subsequent steps are the same as S6 to S10 in the first embodiment. According to the third embodiment, it is possible for the shopper to shop empty-handed without carrying a shopping basket similar to the first and second embodiments. Since the settled products can be received at the parking lot, a burden on the shopper is reduced.

The embodiments described above are intended to facilitate the understanding of the present disclosure and are not intended to limit the gist of the present disclosure. Each component included in the embodiments and the disposition, material, condition, shape, size, and the like thereof are not limited to the above shown and can be changed as appropriate. Further, the configurations shown in the different embodiments can be partially replaced or combined with each other.

What is claimed is:

1. A shopping support system comprising:
a management server configured to store information on a payment account of a shopper and a product receiving location designated by the shopper;
a reservation device configured to allow the shopper to input an operation designating a particular product as a to-be-purchased product;
an automatic sorter configured to pick up one or more to-be-purchased products that have been designated by the shopper;
a register configured to communicate with a payment server that manages the payment account; and
a self-traveling moving object,
wherein the management server is further configured to:
specify the one or more to-be-purchased products as one or more reserved products,
control the automatic sorter to collect the one or more reserved products to be purchased for the shopper,
transmit purchase information to the register to charge the shopper for a total purchase price of the one or more reserved products to be purchased,
load the one or more reserved products unto the self-traveling moving object, and
control the self-traveling moving object loaded with the one or more reserved products in a settled state to travel from a first location corresponding to the automatic sorter to a second location corresponding to the product receiving location designated by the shopper,
the reservation device is a shooter comprising an input port into which the one or more to-be-purchased products, with a corresponding tag including information associated with the shopper, is placed by the shopper; and
the management server specifies the one or more to-be-purchased products with the corresponding tags as the one or more reserved products to be purchased by the shopper associated with the corresponding tags when the one or more to-be-purchased products is placed into the input port by the shopper.

2. The shopping support system according to claim 1, wherein:
the reservation device is further configured such that the input port is switched to an open state where the input port is associated with the shopper and is temporarily opened to be able to place the one or more to-be-purchased products when the operation is input by the shopper; and
the management server is further configured to specify the one or more to-be-purchased products placed in the input port while the input port is in the open state as the one or more reserved products to be purchased by the shopper.

3. The shopping support system according to claim 1, wherein to control the self-traveling moving object to travel from the first location to the second location comprises to acquire position information of the self-traveling moving object using an identification signal of the self-traveling moving object and sensor information detected by a sensor of the self-traveling moving object.

4. The shopping support system according to claim 3, wherein the sensor information comprises detection information of a mark indicating a known location.

5. The shopping support system according to claim 1, wherein the management server is further configured to indicate, to the shopper, that the self-traveling moving object has arrived to the second location corresponding to the product receiving location designated by the shopper, when the shopper has not arrived to the second location.

* * * * *